United States Patent [19]

Armstrong et al.

[11] 4,221,846
[45] Sep. 9, 1980

[54] BATTERY SEPARATOR

[75] Inventors: William A. Armstrong; James A. Wheat, both of Ottawa, Canada

[73] Assignee: Her Majesty the Queen in right of Canada, as represented by the Minister of National Defence, Canada

[21] Appl. No.: 9,090

[22] Filed: Feb. 2, 1979

[30] Foreign Application Priority Data

Mar. 23, 1978 [CA] Canada .................................. 299604

[51] Int. Cl.² .............................................. H01M 4/00
[52] U.S. Cl. ..................................... 429/29; 429/252; 252/62.3 Q; 162/156
[58] Field of Search ................. 429/29, 251, 252, 254; 252/62.3, 500; 106/50; 162/141, 146, 156

[56] References Cited

U.S. PATENT DOCUMENTS

| | | | |
|---|---|---|---|
| 2,454,100 | 11/1948 | Slayter | 429/251 X |
| 2,653,985 | 9/1953 | Philipps | 429/251 X |
| 3,014,085 | 12/1961 | Bachman | 429/251 X |
| 4,041,211 | 8/1977 | Wiacek | 429/27 X |

*Primary Examiner*—Charles F. LeFevour
*Attorney, Agent, or Firm*—Cushman, Darby & Cushman

[57] ABSTRACT

The invention disclosed relates to a novel paper composition for use as a separator material in electrical batteries. The paper composition 30–50%/w of glass fibers and 70–59%/w of a co-polymer of vinyl chloride and vinyl acetate.

12 Claims, 3 Drawing Figures

BATTERY SEPARATOR

BACKGROUND OF THE INVENTION

This invention relates to a glass-vinyon material suitable for use as a separator material in reserve-primary zinc/air batteries at temperatures ranging from about −40° C. to 50° C.

It has been found that separator materials commonly used in zinc/air batteries do not wet readily when placed in contact with alkaline electrolyte at low temperatures i.e. of the order of about −40° C. This problem is evident by the very long time required for the battery to reach an operational voltage after activation at −40° C. Another problem associated with some of these materials is shrinkage or tearing during use at the higher battery operating temperatures typical of a battery during discharge at 50° C.

One such separator material is Dynel, a Trade Mark for a copolymer of vinyl chloride and acrylonitrile in the form of a textile fibre. It was found that the very long time required for the battery to reach an operational voltage after activation at −40° C. was due to the poor wettability of the Dynel separator at that temperature. If the battery was activated at room temperature, cooled to −40° C. and then put on load, the working voltage was attained instantaneously. However, if the 33% KOH electrolyte at −40° C. was added to a battery at the same temperature, the time required for the battery to come up to open circuit voltage (OCV) was about five minutes and the voltage decreased below the minimum acceptable level upon application of the load and did not recover for a further ten to fifteen minutes. These observations were unexpected as a number of commercially available Dynel, polypropylene and nylon materials have been used successfully as separators in zinc/air batteries. However, in the normal configuration of the reserve-primary zinc/air, the battery is activated by the addition of water which forms the electrolyte by leaching out powdered KOH from the porous zinc anode. Thus activation at temperatures below the freezing point of water is not possible.

Attempts to overcome this wettability problem have been made by substituting cellulose filter paper for the Dynel separator, but during evaluation of the batteries it was found that the quality of the paper was not uniform. Some samples would shrink and tear when wetted with electrolyte allowing the formation of anode to cathode short circuits.

BRIEF DESCRIPTION OF INVENTION

It is therefore an object of the invention to obtain a separator material which would ensure rapid activation of a zinc/air bicell at any temperature within the range −40° C. to 50° C., rapid activation being defined as (a) attainment of a stable OCV greater than 1.4 V within 1 minute of the addition of electrolyte, and (b) attainment of a working voltage greater than 0.9 V within 30 seconds of the initiation of a current drain equivalent to a current density of 15 mA/cm$^2$, the drain being initiated not more than 5 minutes after the addition of electrolyte. In addition the material would be required to remain in satisfactory physical condition during the full discharge of the bicell.

According to the invention, a paper composition for use as a separator material in electrical batteries is contemplated, comprising:

(a) 30–50% by weight of glass fibers, and
(b) 70–50% by weight of a copolymer of vinyl chloride and vinyl acetate.

BRIEF DESCRIPTION OF THE DRAWINGS

In the drawings which serve to illustrate embodiments of the invention.

DETAILED DESCRIPTION OF THE INVENTION

Typical reserve-primary zinc/air batteries comprise a zinc anode, an air cathode and an alkaline electrolyte e.g. potassium hydroxide. With reference to the drawings, a suitable air cathode 1 is an activated carbon based material including silver as the electrocatalyst. Such an electrode is made by spreading a paste, comprising activated carbon, polytetrafluoroethylene as binder and wet-proofing agent, silver nitrate, water and a hydrophilic agent to maintain the polytetrafluoroethylene in suspension, evenly on a screen of an electrically conductive material e.g. nickel. The pasted electrode is then dried and pressed. A hydrophobic layer 2 e.g. a polytetrafluoroethylene film, is pressed onto the air side of the cathode 1 to prevent leakage of the potassium hydroxide electrolyte. It will be appreciated that the particular air cathode material and construction are inessential to the present invention.

Figure 1:
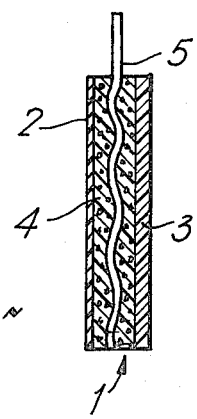
FIG. 1 is a cross-section of a typical air cathode including a separator attached thereto.

With most zinc/air batteries the separator material is made into a bag to enclose the zinc anode but there are advantages to applying the separator 3 directly to the air cathode as shown in FIG. 1. This construction eliminates the entrapment of air in the separator bag which sometimes occurs during activation. The pressing of a separator film 3 onto the electrolyte side of the cathode 1 could easily be incorporated in the manufacturing process. In some cases the hydrophobic film 2 and the separator film 3 could be applied simultaneously.

The first step in the test program was to press a piece of the candidate separator material 3 onto the electrolyte side of an air cathode 1. As illustrated in FIG. 1, the air cathode 1, consisted of a nickel grid 5, on which had been pressed a catalyst-carrier-binder combination 4. In this instance the catalyst was silver, the carrier activated carbon and the binder polytetrafluoroethylene. The cathode had been completed by cladding one side with a semi-permeable hydrophobic polytetrafluorethylene membrane 2. It was onto the opposite side that the candidate separator material 3, was pressed.

Figure 2:
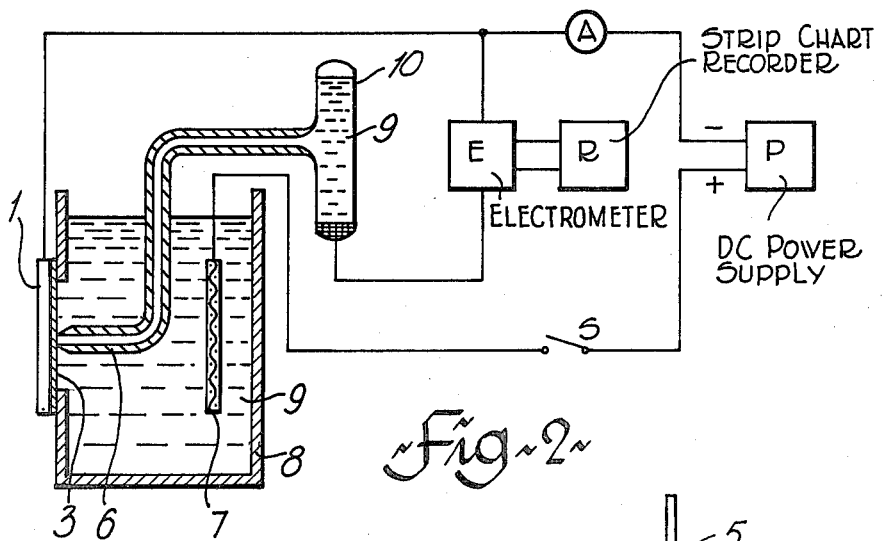
FIG. 2 is a schematic diagram illustrating the set-up for testing candidate separator materials.

As shown in FIG. 2, the air cathode-separator assembly was mounted vertically over an opening in a lucite box 8, which also contained a nickel screen counter electrode 7. This assembly and a beaker containing sufficient 33% potassium hydroxide electrolyte to fill the box were set in an environmental chamber at −40° C. A mercury-mercuric oxide reference electrode 10 was placed so that the luggin capillary 6 was immersed in the beaker. After four hours of cold soaking, the reference electrode 10, was positioned in the lucite box 8, in such a manner that the luggin capillary 6, touched the candidate separator material 3, and the electrolyte 9, was added to the box.

The open circuit electrical potential between the air cathode 1, and the mercury/mercuric oxide reference 10, was measured with an electrometer E, and recorded on a strip chart recorder R. If the air cathode reached a stable potential within fifteen minutes of the addition of the electrolyte this value was recorded and two minutes later a current of 150 mA (26.4 mA/cm$^2$), as measured with the ammeter A, was impressed by closing the switch S, which introduced the constant voltage/constant current DC power supply P, into the circuit. The potential of the cathode with respect to the reference electrode then was recorded for at least five minutes. A polarization of not more than 70 mV greater than that exhibited under the same conditions by a cathode without a separator was considered to be acceptable.

The following materials were investigated:
153MST5—laquered cellulose film made by Du Pont of Canada Ltd.
Celgard K-72-4—microporous polypropylene by Celanese Plastic Co.
Webril E 1451—non-woven polypropylene fabric from Kendall, Fiber Products Division.
Webril E 1489—non-woven Dynel fabric from Kendall.
RA Grade 202—Filter paper made by Reeve Angel.
RA 934AH—Glass fiber filter by Reeve Angel.
The 153MST5, K-72-4, E1451 and E1489 have all been used successfully as separators in other zinc/air systems.

Neither the 153MST5 nor the polypropylene films would wet sufficiently to permit the air cathode to reach a stable OCV within 15 minutes of the addition of the electrolyte. The Dynel (E 1489) did allow a rapid attainment of OCV but not enough of the cathode surface was in contact with the electrolyte for the maintenance of the impressed current and the cathode polarized completely. Cold application of the Dynel to the electrode gave slightly better results than hot but the cathode polarization remained too high for use in a zinc/air cell. Attempts to use a layer of RA 202 filter paper between either a polypropylene or Dynel separator and the air cathode did not produce the wicking effect desired. The time to OCV was lengthened rather than reduced.

Only cathodes having either RA 202 filter paper or RA 934AH glass fiber filter as the separator gave acceptable electrochemical performance. Attainment of a stable OCV required less than 0.5 minutes and the increase in polarization attributable to the separator was negligible. However, on dissassembly of the cells, the glass fiber filter disintegrated and the filter paper separator was found to be torn. Thus none of the materials tested is suitable for use in a reserve-primary zinc/air battery.

It was therefore decided to experiment with other paper materials reinforced with glass fibers. Samples of glass-wood pulp, glass-rayon and glass-vinyon papers were prepared using a hand sheet mold in order to investigate the effects of various parameters on the desired properties of the paper. In order to facilitate a comparison of the properties of these papers, the samples were all made with a basic weight of 90 g/m$^2$. Vinyon is a generic name for manufactured fibers in which the fiber-forming substance is any long chain synthetic polymer composed of at least 85% by weight of vinyl chloride units. The polymers employed include vinyl acetate as co-polymer. One such polymer is known as Vinyon HH manufactured by American Viscose Corporation, which contains 12%/w of vinyl acetate. The vinyon is chosen because of its softening temperature in the range of 100°–135° C. Specifically, such a material will not soften at normal battery operating temperatures i.e. up to about 60° C., but will soften below 135° C. which is the useful upper temperature limit for making glass fiber reinforced papers. Above about 135° C. the glass fibers will not bond properly to the vinyon material.

Before applying a sample to an air cathode and performing the evaluation described above, the material was first subjected to the following simple tests for wettability with electrolyte at −40° C. and for mechanical stability in electrolyte at 75° C., a temperature typical of a battery during discharge at 50° C. (a) Wettability: A sample of about 5 cm in diameter was glued to the lip of a petri dish which was placed in an environmental chamber along with a glass dropper and a beaker of electrolyte. After being equilibrated at −40° C., drops of electrolyte were placed on the sample and its wettability judged to be poor, fair or good.

(b) Mechanical stability: A sample was pressed onto an air cathode which was then immersed in a beaker of electrolyte maintained at 75° C. by a hot plate. After 4 hours the air cathode was removed and any tearing or change of shape noted.

Samples which were judged to have fair or good wettability at −40° C. and did not show tear or more than moderate shrinkage after exposure to electrolyte at 75° C. were subjected to the evaluation described in the preceding section.

The results of this preliminary screening of glass-containing papers are recorded in Table I.

TABLE I

| Evaluation of Various Glass-Filled Papers | | | |
|---|---|---|---|
| Composition % w/w | Wettability at −40° C. | Shrinkage at 75° C. | Contribution to Polarization (mV)* |
| 50/50 Glass/Vinyon | good | none | 19 |
| 50/50 Glass/Wood Pulp | fair | none | 29 |
| 50/50 Glass/Wood Pulp plus 6 Parez Resin | poor | none | — |
| 50/50 Glass/Rayon plus 2 Polyvinyl Alcohol | poor | none | — |
| 67/33 Glass/Wood Pulp | good | disintegrated | — |

*At −40° and a current density of 26.4 mA/cm$^2$

In every case the time of OCV was less than 0.5 minutes and the cathode potential observed on application of the load remained unchanged for 5 minutes. The contribution of the separator to electrode polarization was obtained by subtracting the potential of a bare cathode from the electrode potential observed after 5 minutes of operation.

The glass-vinyon and glass-wood pulp (without resin) samples had acceptable wettability at −40° C. but the samples with either of the polymer additives did not. All samples except the 67/33 Glass/Wood Pulp withstood exposure to electrolyte at 75° C. without significant changes in shape despite the fact that the glass content dissolved under these conditions. For the 50/50 Glass/Vinyon and 50/50 Glass/Wood Pulp, the contribution of electrode polarization was considerably less than the maximum allowable of 70 mV at −40° C. and 26.4 mA/cm$^2$.

During these studies it was noted that the glass-wood pulp papers tore very easily when wet with electrolyte while the glass-vinyon samples did not. As the glass-vinyon samples were equal or superior to the others in terms of wettability at 40° C., mechanical stability at 75° C. and contribution to polarization, all further studies were limited to this type of paper.

EXAMPLES

Small quantities of glass-vinyon paper were made to investigate the effects of varying the fiber diameter of the glass, the ratio of glass to vinyon and the basis weight.

Type 475 glass from Johns-Manville of the following fiber diameter
  Code 102: 0.2 μm
  Code 104: 0.2–0.4 μm
  Code 106: 0.5–0.75 μm
  Code 108: 0.75–1.59 μm
were used along with vinyon HH (No. 23, Bright, 3 denier, ¼ inch) from FMC Corporation. This product comprises 85–86.5%/w of polyvinyl chloride.

In the examples which follow, samples were tested in a zinc/air bicell. The bicell, not shown, consists of a central cavity in which is placed a 2.7 g porous zinc anode and on either side of which is positioned an air cathode in such a way that the side covered with the candidate separator sample is facing the zinc anode. With the appropriate plastic frames and rubber gaskets, the device can be clamped together to form a leak-free electrochemical cell. The cathodes are joined by soldering a connecting strip of silver-coated copper to the cathode tabs and the bicell is activated by the introduction of 33% KOH electrolyte through a filling port into the central cavity.

To evaluate a separator sample the bicell was placed in an environmental chamber at −40° C. and after 2 hours activated with electrolyte which had also been equilibrated at that temperature. Five minutes after activation the cell was discharged by the impression of a constant current of 200 mA (16 mA/cm² on each electrode surface) from a power supply. The circuit was arranged so that a decrease in cell voltage below 0.90 V stopped the discharge and the interval timer used to record the duration of the discharge to the nearest 0.1 minute. In all cases an OCV of greater than 1.4 V was reached before all of the electrolyte had been added to the cell. The five minute delay before applying the load was required for the chamber to return to the designated temperature from the fluctuation caused by opening the chamber door to activate the cell.

Separator evaluations were carried out in a similar manner with the environmental chamber controlling the temperature at 50° C. With every discharge a fresh zinc anode and a newly prepared set of cathodes equipped with pieces of the material to be tested were used.

From previous work it was known that the duration of discharge at −40° C. under the above conditions was 128–130 minutes for a bicell having RA 202 filter paper made by Reeve Angel, as the separator material provided the paper did not tear. Thus any separator permitting a discharge of 130 minutes or more was considered to be acceptable for use at −40° C. At 50° C. an absence of voltage fluctuations which might indicate the presence of intermittent internal anode to cathode shorting and a discharge time of at least 500 minutes (75% utilization of the zinc in the electrochemical discharge reaction) were used as the acceptability criteria.

Figure 3:
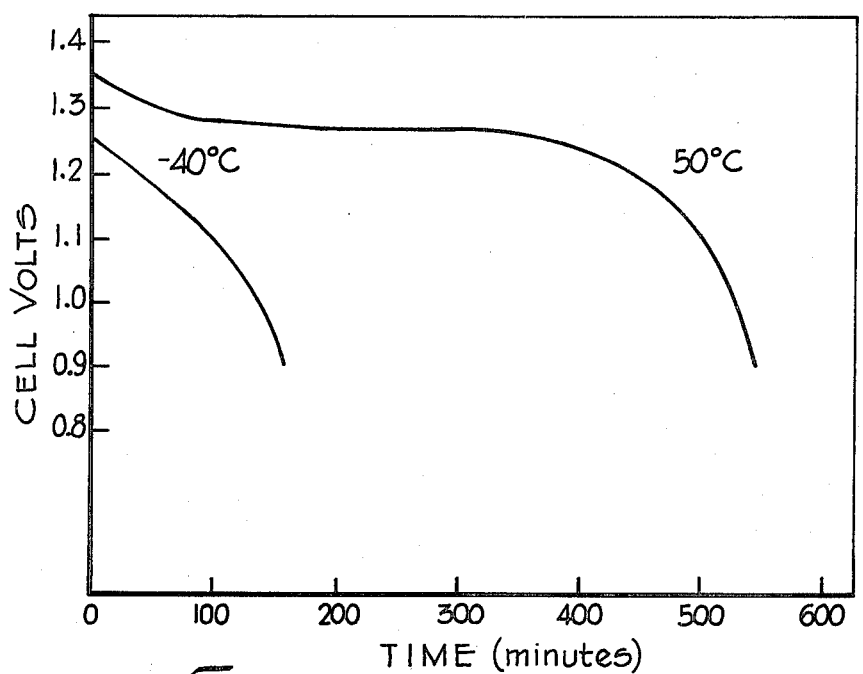
FIG. 3 illustrates discharge curves at 50° C. and −40° C. of bicells equipped with the glass-vinyon separator material composition as described for example 8.

The results of the investigation of glass-vinyon papers are summarized in Table II and discharge curves at −40° C. and 50° C. for bicells equipped with Sample 8 separator material shown in FIG. 3.

TABLE II

| | | | | | | Properties of Glass-Vinyon Papers | | | | | |
|---|---|---|---|---|---|---|---|---|---|---|---|
| | | | Basis | | | Tensile Strength | | | Contribution to | Discharge | Time** |
| Example | Glass | | Wt | Thickness | Density | Dry | Wet | Burst | Polarization* | −40° | 50° |
| No. | Code | % | g/m² | mil | g/cm³ | lb/in | lb/in | lb/in² | mV | min | min |
| 1 | 108 | 40 | 75 | | | | | | failed wettability test | | |
| 2 | 108 | 40 | 151 | | | | | | failed wettability test | | |
| 3 | 106 | 40 | 88 | 15.2 | 0.229 | 2.1 | 2.3 | 5.2 | 21 | 154 | 562 |
| 4 | 106 | 50 | 92 | 15.3 | 0.235 | 1.6 | | 4.1 | failed electrolyte at 75° test | | |
| 5 | 104 | 30 | 92 | 16.2 | 0.222 | 2.8 | 3.1 | 6.0 | 27 | 146 | 557 |
| 6 | 104 | 40 | 66 | | | | | | 20 | 134 | 500 |
| 7 | 104 | 40 | 92 | 14.5 | 0.250 | 2.5 | | 5.2 | 28 | 142 | 546 |
| 8 | 104 | 40 | 114 | 17.9 | | | | | 30 | 152 | 546 |
| 9 | 104 | 50 | 51 | 8.1 | 0.246 | 1.0 | 1.3 | 3.0 | 11 | 134 | 582 |
| 10 | 104 | 50 | 84 | 14.1 | 0.234 | 1.9 | 2.0 | 3.6 | 19 | 150 | 570 |
| 11 | 104 | 50 | 117 | 18.8 | 0.244 | 2.4 | 2.4 | 5.6 | 23 | 139 | 579 |
| 12 | 104 | 60 | 86 | 13.6 | 0.247 | 1.6 | 1.6 | 3.6 | failed electrolyte at 75° test | | |
| 13 | 104 | 60 | 114 | 17.6 | 0.255 | 2.4 | | 4.7 | failed electrolyte at 75° test | | |
| 14 | 102 | 30 | 91 | 14.9 | 0.239 | 3.0 | | 6.2 | 25 | 169 | 531 |
| 15 | 102 | 40 | 59 | 9.8 | 0.238 | 1.9 | | 5.3 | 17 | 131 | 513 |
| 16 | 102 | 40 | 92 | 14.5 | 0.249 | 2.7 | | 5.3 | failed electrolyte at 75° test | | |
| 17 | 102 | 50 | 87 | 13.8 | 0.277 | 2.1 | | 4.9 | failed electrolyte at 75° test | | |

*At −40° and a current density of 26.4 mA/cm².
**For a Zn/Air bicell with a 2.7g anode discharged at 200 mA (16 mA/cm²).

Papers containing glass fibers of the largest diameter (Code 108) failed to wet when exposed to electrolyte at −40° C. and as the fiber diameter was decreased, an increasing number of samples failed the test for mechanical stability in electrolyte at 75° C. Adjustments in the percentage of glass used and the basis weight gave samples containing Code 106, 104 or 102 which passed not only the tests mentioned above but contributed little to electrode polarization and permitted zinc/air bicells to be discharged for the required times at −40° and 50° C.

The tensile strength of a paper sample was also affected by the diameter of the glass fibers. When a constant percentage of glass and a constant basis weight were maintained, the tensile strength increased as the fiber diameter decreased (compare examples 3, 7 and 16).

For any given glass fiber diameter, samples having a glass content higher than a certain value failed the test for mechanical stability in electrolyte at 75° C. The highest permissible content was 50% for Code 104 glass. The Tensile strength was also found to decrease with increasing glass content.

Most of the studies on the effects of glass content and basis weight on electrochemical measurements (polarization and discharge times) were performed with papers made from Code 104 glass. The longest discharge times at $-40°$ C. were obtained with 40% glass and basis weight 114 g/m$^2$ (example 8) and 50% glass and basis weight 84 g/m$^2$ (example 10).

In the limited range of papers made with Code 102 glass, example 14 (30%, basis weight 91) gave a $-40°$ discharge nearly 40 minutes longer than example 15 (40%, basis weight 59).

In conclusion, ten of the seventeen examples met the prescribed criteria for acceptability as a separator material. Thus, the useful operating limits for fiber diameter were found to be 0.2–0.75 μm; for glass content 30–50%/w; and basis weight 59–117 g/m$^2$. However, it is evident that some examples performed better than others, particularly during discharge of bicells at $-40°$ C. As the limiting factor in the overall capabilities of zinc/air batteries is their poor performance at low temperature (FIG. 3), this factor has been emphasized more than the length of discharge at 50° C. None of the bicells discharged at 50° C. showed signs of penetration of the separator by zinc. Such penetration would cause internal shorts and would result in fluctuations of the cell voltage whereas all cells displayed very smooth discharge curves (FIG. 3). Neither was there any visible evidence of separator disintegration when bicells that had been discharged at 50° C. were disassembled. Despite the fact that measurements of the loss of weight of the separator during the exposure to electrolyte at this temperature indicated that all of the glass had dissolved, the remaining material was untorn and sufficiently dense to prevent the formation of internal shorts in the cell.

The following additional examples illustrate the preparation of samples on a paper machine in a continuous roll.

Because large quantities of materials are required for a machine run, it was decided that only two or three sample formulations would be used. From a careful examination of the results with laboratory hand sheets (Table II) it was decided to prepare the following papers:

30% Code 102 glass—70% vinyon at basis weight of 70 g/m$^2$.
30% Code 102 glass—70% vinyon at basis weight of 90 g/m$^2$.
40% Code 104 glass—60% vinyon at basis weight 70 g/m$^2$.

Aqueous suspensions of these fiber mixtures were stored in separate tanks and pumped to the machine (not shown), where a uniform fiber web was deposited on a moving screen which allowed the water to drain away. The wet web was transferred to a moving felt, and after being lightly pressed between rolls, was led through the drying cabinet where it was passed around six heated drums. On leaving the cabinet the paper was collected on a take-up roll.

The physical properties of these papers, calculated by averaging the values measured for samples taken at the start and finish of each roll, are recorded in Table III. In addition the %ash for each sample is given. As the ash represents the glass content of the sample, these figures confirm the stated glass/vinyon ratio and demonstrate the uniformity of the composition of the materials produced.

TABLE III

| Properties of Machine-Made Glass-Vinyon Papers | | | | | | | | | | |
|---|---|---|---|---|---|---|---|---|---|---|
| | | | Basis | | | Tensile Strength* | | | | |
| | | | | | | Dry | | Wet | | |
| Example | Glass | | Wt | Thickness | Density | MD | CD | MD | CD | Ash |
| No. | Code | % | g/m$^2$ | mil | g/cm$^3$ | lb/in | | lb/in | | % |
| 18 | 102 | 30 | 70. | 12. | 0.222 | 3.1 | 2.5 | 3.3 | 2.6 | 29.1 |
| 19 | 102 | 30 | 89. | 15. | 0.230 | 4.2 | 3.1 | 4.4 | 3.4 | 28.7 |
| 20 | 104 | 40 | 96. | 16. | 0.243 | 3.4 | 2.5 | 3.6 | 2.9 | 39.4 |
| E 1489 | (dynel) | | 44. | 4. | | 4.8 | 1.6 | | | |

*MD = Machine Direction.
CD = Cross Direction.

For comparison, physical data supplied by the manufacturer for Webril E 1489 are also included in Table III. This Dynel material is a commonly used separator material which was rejected because of its poor wettability at $-40°$ C. As it was considered necessary to have a double layer of E 1489 for a suitable separator, the weight per bicell of separator would have been comparable with that for the glass-vinyon papers but the thickness would have been halved. The extra 7 mil thickness of paper separator is not considered to significantly affect good bicell design. The tensile strengths of the paper samples are slightly less than that of the Dynel when measured in the machine direction but greater in the cross direction. Therefore the paper is expected to be as resistant to tearing during battery manufacture and operation as the Dynel.

The electrochemical properties of air electrodes and bicells equipped with machine-made glass-vinyon separators are given in Table IV.

TABLE IV

| Glass-Vinyon Separators on Air Electrodes and in Bicells | | | |
|---|---|---|---|
| | | Discharge Time** | |
| Example | Contribution to Polarization* | $-40°$ | 50° C. |
| No. | mV | min | min |
| 18 | 23 | 124 | 520 |
| 19 | 29 | 137 | 560 |
| 20 | 24 | 137 | 520 |
| 14+ | 25 | 139 | 530 |

*At $-40°$ with a current density of 26.4 mA/cm$^2$.
**For a Zn/Air bicell with a 2.7g anode discharged at 200 mA (16mA/cm$^2$).
+Composition the same as Example 14 in Table II.

It will thus be apparent from Table IV that the separator material of Example 19 is preferred in view of its higher discharge time, especially at 50° C.

In view of the various embodiments described above, it should be apparent to those skilled in the art that the present invention may be embodied in forms other than those specifically described herein without departing from the spirit or central characteristics of the invention. Thus, the specific embodiments described above are to be considered in all respects as illustrative and by no means restrictive.

The embodiments of the invention in which an exclusive property or privilege is claimed are defined as follows:

1. A paper composition for use as a separator material in electrical batteries, comprising a mixture of
   (a) 30–50%/w of glass fibers, and
   (b) 70–50%/w of a co-polymer of vinyl chloride and vinyl acetate.

2. A paper composition according to claim 1 wherein the fiber diameter of the glass is about 0.2 μm to 0.75 μm.

3. A glass composition according to claim 2 wherein the basis weight of glass in the composition is about 59–117 g/m$^2$.

4. A glass composition according to claim 1, comprising 30% glass fibers and 70% of a co-polymer of vinyl chloride and vinyl acetate, wherein the fiber diameter of the glass is about 0.2 μm and wherein the basis weight of glass in the composition is about 70 g/m$^2$.

5. A paper composition according to claim 1, comprising 30% glass fibers and 70% of a co-polymer of vinyl chloride and vinyl acetate, wherein the fiber diameter of the glass is about 0.2 μm and wherein the basis weight of glass in the composition is about 90 g/m$^2$.

6. A paper composition according to claim 1, comprising 40%/w of glass fibers and 60%/w of a copolymer of vinyl chloride and vinyl acetate, wherein the fiber diameter of the glass is about 0.2 to 0.4 μm, and wherein the basis weight of glass in the composition is about 70 g/m$^2$.

7. A paper composition according to claim 4, 5 or 6, wherein the co-polymer comprises 85 to 88%/w of vinyl chloride and 15 to 12%/w of vinyl acetate.

8. In a reserve primary zinc/air electrical battery, said battery comprising a series of electrically connected electrochemical cells, said cells including a zinc anode, an air cathode, a separator for said anode and cathode and an alkaline electrolyte, the improvement comprising said separator being made of a paper composition comprising a mixture of
   (a) 30–50%/w of glass fibers, and
   (b) 70–50%/w of a co-polymer of vinyl chloride and vinyl acetate.

9. An electrical battery according to claim 8, wherein the paper composition comprises 30% glass fibers and 70% of a co-polymer of vinyl chloride and vinyl acetate, wherein the fiber diameter of the glass is about 0.2 μm and wherein the basis weight of glass in the composition is about 70 g/m$^2$.

10. An electrical battery according to claim 8, wherein the paper composition comprises 30% glass fibers and 70% of a co-polymer of vinyl chloride and vinyl acetate, wherein the fiber diameter of the glass is about 0.2 μm and wherein the basis weight of glass in the composition is about 90 g/m$^2$.

11. An electrical battery according to claim 8, wherein the paper composition comprises 40%/w of glass fibers and 60%/w of a co-polymer of vinyl chloride and vinyl acetate, wherein the fiber diameter of the glass is about 0.2 to 0.4 μm, and wherein the basis weight of glass in the composition is about 70 g/m$^2$.

12. An electrical separator for a battery containing an alkaline electrolyte, said separator consisting essentially of a mixture of from 30% to 50% by weight of glass fibers having a fiber diameter of about 0.2 μm to about 0.75 μm and the weight basis of the glass in said composition being about 59 to about 117 g/m$^2$, and from 70% to 50% by weight of a copolymer of vinyl chloride and vinyl acetate.

* * * * *